(12) United States Patent
Suzuki et al.

(10) Patent No.: US 7,169,956 B2
(45) Date of Patent: Jan. 30, 2007

(54) DOUBLE METAL CYANIDE COMPLEX CATALYST, ITS PRODUCTION PROCESS AND ITS UTILIZATION

(75) Inventors: Chitoshi Suzuki, Ibaraki (JP); Hiroki Fukuda, Ibaraki (JP); Yoshinori Toyota, Ibaraki (JP); Shigeru Ikai, Ibaraki (JP); Hideo Sakurai, Ibaraki (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/211,453

(22) Filed: Aug. 26, 2005

(65) Prior Publication Data

US 2006/0004233 A1   Jan. 5, 2006

Related U.S. Application Data

(63) Continuation of application No. PCT/JP2004/008070, filed on Jun. 3, 2004.

(30) Foreign Application Priority Data

Jun. 4, 2003   (JP) .............................. 2003-159341

(51) Int. Cl.
*B01J 27/26* (2006.01)
*B01J 31/00* (2006.01)
*C07C 43/02* (2006.01)
*C07C 41/00* (2006.01)

(52) U.S. Cl. ..................... 568/679; 502/159; 502/172; 502/175; 568/620; 568/607

(58) Field of Classification Search ................ 502/175, 502/172, 159; 568/679, 620, 607
See application file for complete search history.

(56) References Cited

U.S. PATENT DOCUMENTS

| 4,472,560 A | 9/1984 | Kuyper et al. |
| 5,158,922 A | 10/1992 | Hinney et al. |
| 5,627,122 A | 5/1997 | Le-Khac et al. |
| 5,639,705 A | 6/1997 | Bowman et al. |
| 5,767,323 A | 6/1998 | Televantos et al. |
| 5,780,584 A | 7/1998 | Le-Khac et al. |
| 5,783,513 A * | 7/1998 | Combs et al. .............. 502/175 |
| 5,900,384 A | 5/1999 | Soltani-Ahmadi et al. |

FOREIGN PATENT DOCUMENTS

| JP | 58-185621 | 10/1983 |
| JP | 3-89946 | 4/1991 |
| JP | 4-145123 | 5/1992 |
| JP | 6-41292 | 2/1994 |
| JP | 09-31185 | 2/1997 |
| JP | 2000-513389 | 10/2000 |
| JP | 2000-513647 | 10/2000 |
| JP | 2003-515440 | 5/2003 |
| JP | 2003-165836 | 6/2003 |
| JP | 2003-190808 | 7/2003 |
| WO | WO 97/23544 | 7/1997 |
| WO | WO 97/26080 | 7/1997 |
| WO | WO 01/39883 | 6/2001 |

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

Provided is a double metal cyanide complex catalyst with a high activity which is readily produced on an industrial scale. The double metal cyanide complex catalyst is of a fine particle form and contains t-butyl alcohol or, t-butyl alcohol and another organic compound as an organic ligand. The catalyst of the fine particle form has a volume-average particle size in a range of from 3 to 20 μm, based on measurement by a light scattering method for measuring fine particles having particle sizes of at least 0.15 μm. A particle content of the catalyst in a particle size range of at least 0.15 μm and at most 1 μm is less than 5% by volume, and a particle content of the catalyst over a particles size of 1 μm is in a range of more than 95% and at most 100% by volume.

14 Claims, No Drawings

DOUBLE METAL CYANIDE COMPLEX CATALYST, ITS PRODUCTION PROCESS AND ITS UTILIZATION

CROSS-REFERENCE TO A RELATED APPLICATION

The present application is a continuation of International Application PCT/JP04/008070, filed Jun. 3, 2004, which claims priority to Japanese Patent Application No. 2003-159341, filed Jun. 4, 2003.

TECHNICAL FIELD

The present invention relates to a double metal cyanide complex catalyst applicable to a catalyst for ring opening polymerization of an alkylene oxide, its production process and its utilization.

BACKGROUND ART

Heretofore, polyether polyols, which are starting materials for polyurethane elastomers, adhesives, paints, sealants, and so on, have been produced by polymerization of alkylene oxides such as ethylene oxide or propylene oxide by use of initiators having active hydrogens. Double metal cyanide complex catalysts (hereinafter also referred to as DMC catalysts) are well known as a typical polymerization catalyst for the alkylene oxides. The DMC catalysts are catalysts containing an organic ligand and metal compounds, and are typified by compounds in which zinc hexacyanocobaltate ($Zn_3[Co(CN)_6]_2$) is coordinated with an organic ligand, water and zinc chloride. Such DMC catalysts are produced, for example, by a method of mixing an excessive amount of an aqueous solution of zinc chloride with an aqueous solution of alkali metal hexacyanocobaltate, optionally in the presence of the organic ligand, to precipitate a solid, and then mixing the organic ligand or its aqueous solution with the solid to coordinate the organic ligand thereto.

It was recently reported that the life of the DMC catalyst became remarkably long when t-butyl alcohol was used as the organic ligand (Patent Document 1). Furthermore, Patent Document 2 describes that use of a highly active DMC catalyst with an organic ligand such as t-butyl alcohol decreases an amount of the catalyst used and eliminates a need for a process of removing the DMC catalyst after production of polyether polyols.

In the production processes of the DMC catalysts, an alkali metal halide as a by-product is also dissolved in a slurry containing the DMC catalyst, the organic ligand and water, obtained by reacting an aqueous solution of zinc chloride with an aqueous solution of an alkali metal hexacyanocobaltate, and then reacting the organic ligand or an aqueous solution thereof with the reaction product. A cake containing the DMC catalyst is separated from the slurry by such a method as filtration or centrifugal separation. However, unless the separation by filtration or centrifugal separation is enough, some of the alkali metal halide remains in the cake containing the DMC catalyst. It is known that it acts as a catalyst poison and causes deterioration of polymerization activity (Patent Document 3).

This remaining alkali metal halide can be removed by washing the cake containing the DMC catalyst with the organic ligand or the aqueous solution thereof. However, if the filterability of the DMC catalyst is poor, the washing efficiency will drop. Accordingly, there have been demands for DMC catalysts with good filterability. DMC catalysts coordinated with glyme as the organic ligand are obtained in the form of crystalline particles and it was thus industrially satisfactory in terms of the filterability. However, DMC catalysts coordinated with t-butyl alcohol as the organic ligand (hereinafter also referred to as t-butyl alcohol type DMC catalysts) have poor filterability and the slurry containing the DMC catalyst, water and t-butyl alcohol obtained through the production process is often obtained in the form of sticky paste, posing a problem that it is very difficult to separate the filter cake from the filtrate in a separation process of filtering the DMC catalytic component from the slurry.

Patent Document 4 suggests a method for producing DMC catalysts which can be readily filtered by controlling the order of addition of an aqueous solution of zinc chloride and an aqueous solution of an alkali metal cyanometalate, a reaction temperature and a stoichiometric ratio of Zn/Co in producing the DMC catalysts. However, as described in Patent Document 5, the above method is effective for the DMC catalysts with glyme as the organic ligand, but it was not effective for the t-butyl alcohol type DMC catalysts, because the resultant slurry containing the formed DMC catalyst became as gelatinous as difficult to be separated, with increase of the ratio of Zn/Co.

Furthermore, Patent Document 5 describes that in the production of the t-butyl alcohol type DMC catalysts, the Zn/Co ratio is decreased in preparation or excess zinc chloride is washed away in washing steps of the cake containing the DMC catalyst, thereby forming crystalline particles and providing the DMC catalyst with high activity and without the problem of difficulty in filterability. However, even though the separation by filtration became relatively easy, there was a problem that control of an amount of zinc chloride coordinated was difficult; for example, in a case where the amount of zinc chloride coordinated is too small, the crystallinity becomes too high, thereby losing the activity.

Furthermore, Patent Document 6 describes t-butyl alcohol type DMC catalysts and DMC catalyst-containing cakes with t-butyl alcohol and water, in which at least 90% of particles of the DMC catalyst have the particle size within the range of from 0.1 to 10 μm. In the invention, the DMC catalyst is not separated from the cake by filtration, but the DMC catalyst-containing cake is separated by centrifugal separation which is not suitable for industrialization.

On the other hand, Patent Document 7 describes a process for continuously and stably producing catalysts.

Patent Document 1: JP-A-04-145123
Patent Document 2: JP-A-2000-513389 (WO97/23544)
Patent Document 3: U.S. Pat. No. 4,472,560 (JP-A-58-185621)
Patent Document 4: U.S. Pat. No. 5,158,922 (JP-A-06-41292)
Patent Document 5: U.S. Pat. No. 5,627,122 (JP-A-09-31185)
Patent Document 6: U.S. Pat. No. 5,639,705 (JP-A-2000-513647)
Patent Document 7: JP-A-03-89946

DISCLOSURE OF THE INVENTION

As described above, the DMC catalysts with high activity coordinated with t-butyl alcohol or the like can be produced according to the processes conventionally proposed. However, there was a problem that the filterability of the DMC catalysts was not good, that is, separation by filtration took a very long time or that multiple catalyst washing steps were required, thereby resulting in increasing the cost of the catalysts.

Furthermore, in cases where such DMC catalysts were used as dispersed in a polyether polyol or the like, the increase in the mass ratio of DMC catalyst particles in the catalyst-containing compositions led to loss of fluidity to cause a problem of hard handling.

Under such circumstances, there were strong desires for a process for readily producing DMC catalysts with high catalytic activity, good filterability, and excellent workability.

The Inventors have conducted extensive studies to achieve the above object and, as a result, have accomplished the following invention.

<1>: A double metal cyanide complex catalyst of a fine particle form comprising t-butyl alcohol or, t-butyl alcohol and another organic compound as an organic ligand, wherein the catalyst of the fine particle form has a volume-average particle size in a range of from 3 to 20 μm, based on measurement by a light scattering method for measuring fine particles having particle sizes of at least 0.15 μm, wherein a particle content of the catalyst in a particle size range of at least 0.15 μm and at most 1 μm is less than 5% by volume, and wherein a particle content of the catalyst over a particle size of 1 μm is in a range of more than 95% and at most 100% by volume.

<2>: A catalyst-containing composition, wherein the double metal cyanide complex catalyst as defined above is dispersed in at least one dispersion medium selected from polyether monools and polyether polyols.

<3>: A process for producing the double metal cyanide complex catalyst as defined above, comprising (1) a step (a) of merging a continuous flow of an aqueous solution of a metal halide compound and a continuous flow of an aqueous solution of an alkali metal cyanometalate in such a proportion that an atomic number ratio of (metal atoms in the metal halide compound)/(metal atoms other than an alkali metal in the alkali metal cyanometalate) is in a range of from 5 to 16, and transferring a merged liquid to a first reactor mentioned below, (2) a step (b) of retaining the merged liquid in the first reactor under stirring at a temperature of from 0 to 90° C. for an average residence time of at least 1 minute to react the metal halide compound with the alkali metal cyanometalate, and continuously transferring a reaction product liquid to a second reactor mentioned below, (3) a step (c) of continuously introducing a flow of an organic ligand or an aqueous solution of an organic ligand into the second reactor, retaining a mixture of the organic ligand or the aqueous solution of the organic ligand with the reaction product liquid in the second reactor under stirring at a temperature of from 40 to 100° C. for an average residence time of at least 3 minutes, and continuously transferring a dispersion liquid containing a resultant double metal cyanide complex catalyst to the following step (d), and (4) the step (d) of filtering the dispersion liquid containing the double metal cyanide complex catalyst to obtain a filter cake containing the double metal cyanide complex catalyst.

<4>: The process according to above <3>, further comprising a step (e) of mixing the filter cake obtained in the step (d) with an aqueous solution of an organic ligand to obtain a mixture, stirring the mixture at a temperature of from 0 to 100° C. for a predetermined period of time, and filtering the mixture to obtain a second filter cake, and optionally further comprising a step (e') of repeating the same step as the step (e) at least once for the second filter cake with an organic ligand or an aqueous solution of an organic ligand to obtain a third or subsequent filter cake.

<5>: A process for producing the catalyst-containing composition as defined above, comprising mixing the filter cake obtained in the process as defined above with at least one dispersion medium selected from polyether monools and polyether polyols, and optionally removing volatile components.

<6>: A process for producing the catalyst-containing composition as defined above, comprising mixing the filter cake obtained in the process as defined above with an organic ligand or an aqueous solution of an organic ligand to obtain a mixture, stirring the mixture for a predetermined period of time, then mixing the mixture with at least one dispersion medium selected from polyether monools and polyether polyols, and thereafter removing such volatile components as the organic ligand and water.

<7>: A process for producing a polyether, comprising subjecting an alkylene oxide to ring opening polymerization with an initiator in the presence of the double metal cyanide complex catalyst as defined above, or in the presence of the catalyst-containing composition as defined above.

EFFECTS OF THE INVENTION

The double metal cyanide complex catalyst having a small distribution width of particle sizes and a large average particle size according to the present invention is excellent in filterability, whereby it can be readily produced on an industrial scale. Furthermore, when it is used for ring opening polymerization of an alkylene oxide, it is easy to handle and it shows a high catalytic activity. A high-molecular-weight polyether having a narrow molecular weight distribution, a low total unsaturation degree and a low viscosity can be produced by carrying out ring opening polymerization of alkylene oxides with an initiator by use of the double metal cyanide complex catalyst of the present invention.

BEST MODE FOR CARRYING OUT THE INVENTION (Double Metal Cyanide Complex Catalyst)

The present invention employs a double metal cyanide complex catalyst containing t-butyl alcohol or, t-butyl alcohol and another organic compound as an organic ligand. The double metal cyanide complex catalyst is typically represented by Formula (1).

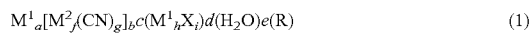

$$M^1_a[M^2_f(CN)_g]_b c(M^1_h X_i) d(H_2O) e(R) \qquad (1)$$

($M^1$ and $M^2$ are metals, X is a halogen atom, R is an organic ligand, and a, b, c, d, e, f, h and i are numbers which can differ according to valences of the metal atoms, the coordination number of the organic ligand, and so on.)

$M^1$ is preferably a metal selected from Zn(II), Fe(II), Fe(III), Co(II), Ni(II), Mo(IV), Mo(VI), Al(III), V(V), Sr(II), W(IV), W(VI), Mn(II), Cr(III), Cu(II), Sn(II) and Pb(II), and particularly preferably Zn(II) or Fe(II).

$M^2$ is preferably a metal selected from Fe(II), Fe(III), Co(II), Co(III), Cr(II), Cr(III), Mn(II), Mn(III), Ni(II), V(IV) and V(V), and particularly preferably Co(III) or Fe(III).

R is an organic ligand. The organic ligand is preferably t-butyl alcohol or a combination of t-butyl alcohol and another compound, and the compound other than t-butyl alcohol is preferably a compound selected from alcohols, ethers, ketones, esters, amines and amides.

Specifically, the compound other than t-butyl alcohol is one or two or more compounds selected from n-butyl alcohol, isobutyl alcohol, t-pentyl alcohol, isopentyl alcohol, N,N-dimethylacetamide, glyme (ethylene glycol dimethyl ether), diglyme (diethylene glycol dimethyl ether), triglyme (triethylene glycol dimethyl ether), ethylene glycol mono-t-butyl ether, isopropyl alcohol, and dioxane. The dioxane may be either 1,4-dioxane or 1,3-dioxane, and is preferably 1,4-dioxane.

R is preferably t-butyl alcohol alone or a combination of t-butyl alcohol with t-pentyl alcohol or ethylene glycol mono-t-butyl ether.

The double metal cyanide complex catalyst of the present invention is a double metal cyanide complex catalyst wherein the catalyst has a volume-average particle size in a range of from 3 to 20 µm, based on measurement by a light scattering method for measuring fine particles having particle sizes of at least 0.15 µm, wherein a particle content of the catalyst in a particle size range of at least 0.15 µm and at most 1 µm is less than 5% by volume, and wherein a particle content of the catalyst over a particle size of 1 µm is in a range of more than 95% and at most 100% by volume.

The volume-average particle size of catalyst particles and the volume percentage of catalyst particles are based on values obtained by measuring catalyst particles dispersed in methanol by means of a light scattering method. Specifically, the values are obtained through measurement by means of Microtrac particle size analyzer which is a particle size analyzer based on a light scattering phenomenon (FRA-9220 manufactured by NIKKISO CO, LTD, which divides the measurement range of from 0.12 to 700 µm into 50 divisions) and by using methanol as a dispersion solvent and a circulating solvent. This Microtrac particle size analyzer can measure a volume-average particle size of particles having particle sizes of at least 0.15 µm and a volume percentage of catalyst particles.

In the double metal cyanide complex catalyst of the present invention, the volume-average particle size is preferably in a range of from 5 to 15 µm, particularly preferably in a range of from 7 to 12 µm. Furthermore, the content of the catalyst particles in the particle size range of at least 0.15 µm and at most 1 µm is preferably at most 3% by volume and the content of the catalyst particles over the particle size of 1 µm is preferably from 97 to 100% by volume. Particularly, the content of the catalyst particles in the particle size range of at least 0.15 µm and at most 1 µm is preferably at most 1% by volume and, most preferably, the catalyst substantially contains no catalyst particle in the particle size range of at least 0.15 µm and at most 1 µm. Here, the term "the catalyst substantially contains no catalyst particles" means that no catalyst particles are detected by the measurement with the above Microtrac particle size analyzer.

By the measurement with the above Microtrac particle size analyzer, no particles in the particle size range of less than 0.15 µm can be measured. However, the double metal cyanide complex catalyst of the present invention is considered to substantially contain no particles in the particle size range of less than 0.15 µm. It is because a content of particles in the particle size range of less than 0.15 µm is considered to be lower than that of particles in the particle size range of at least 0.15 µm and at most 1 µm in an aggregate of particles having such a distribution that a content of particles in the particle size range of at least 0.15 µm and at most 1 µm is less than 5% by volume and that a volume-average particle size is from 3 to 20 µm. Furthermore, in a case where an aggregate of particles substantially contains no particles in the particle size range of at least 0.15 µm and at most 1 µm, the aggregate is considered to substantially contain no fine particles in the particle size range of less than 0.15 µm, either. Particularly, in the case of the production process described below, the catalyst particles are prepared through the step of separation by filtration, and the content of particles in the particle size range of less than 0.15 µm in the catalyst is thus considered to be far lower than that of particles in the particle size range of at least 0.15 µm and at most 1 µm.

Moreover, the catalyst according to the present invention preferably, substantially contains no particles in the particle size range of at least 100 µm, based on the content represented by % by volume, and, particularly preferably, substantially contains no particles in the particle size range of at least 50 µm.

The double metal cyanide complex catalyst of the present invention having the specific volume-average particle size (hereinafter referred to simply as an average particle size) and volume percentage, can be produced by the specific process as described below. The catalyst is preferably stored in a condition of contact with a liquid (hereinafter referred to as a wet condition) until it is used. If the catalyst in the wet condition is dried, the catalytic activity could degrade. Once the catalyst is dried, it hardly shows a sufficient catalytic activity even if it is restored into the wet condition. It is conceivably because the drying changes the coordination state of the ligand or the crystal structure of the catalyst.

Examples of the catalyst in the wet condition include a filter cake (containing an organic ligand or a liquid such as an aqueous solution of an organic ligand used in the production process) obtained in the production process described below, a dispersion liquid obtained by newly adding a dispersion medium to the filter cake, and so on. Particularly preferred is a catalyst that can be supplied to a reaction as it is in the wet condition.

The present invention also provides a catalyst-containing composition in which the above-mentioned double metal cyanide complex catalyst is dispersed in at least one dispersion medium selected from polyether monools and polyether polyols. The catalyst in this catalyst-containing composition can be supplied as it is, as a catalyst in the wet condition to a reaction of producing a polyether by ring opening polymerization of an alkylene oxide with an initiator. The polyether monool or polyether polyol used as the dispersion medium can be used as the initiator, and a catalyst-containing composition can be prepared by appropriately selecting as the dispersion medium an initiator for an aimed polyether.

In use of the double metal cyanide complex catalyst contained in the composition, the entire catalyst-containing composition of the present invention can be handled in the same manner as the catalyst is. Likewise, a composition in which the double metal cyanide complex catalyst is dispersed in a dispersion medium other than the polyether monools and the polyether polyols, or the double metal cyanide complex catalyst of the present invention in another wet condition can also be handled as a whole in the same manner as the catalyst is.

The polyether monool or polyether polyol used as the dispersion medium in the catalyst-containing composition of the present invention can serve as an initiator when the double metal cyanide complex catalyst in the catalyst-containing composition is used later as a catalyst for ring opening polymerization of an alkylene oxide. Therefore, in a case where a polyether monool or polyol to be produced has the number of functional groups different from that of the polyether monool or polyol contained in the catalyst-containing composition, an amount of the polyether monool or polyol contained in the catalyst-containing composition is preferably as small as possible in order to reduce its influence. However, if the amount of the dispersion medium becomes small, the viscosity of the catalyst-containing composition itself increases to decrease the fluidity, which might lead to a problem in handling.

The double metal cyanide complex catalyst of the present invention contains the catalyst particles in the particle size range of at most 1 μm in a very small amount or substantially contains no particles in that range, and the average particle size is larger than those of the conventional catalysts. Therefore, when it is formulated as a catalyst-containing composition, the double metal cyanide complex catalyst can be contained in a large content in the catalyst-containing composition. Even if the content is so large, the present invention has such an effect that the fluidity of the catalyst-containing composition can be maintained. Another effect is that the catalyst particles are readily dispersed in the dispersion medium in production of the catalyst-containing composition.

The polyether monool or polyol to be used as the dispersion medium in production of the catalyst-containing composition is preferably one having from 1 to 12 hydroxyl groups and a hydroxyl value of from 8 to 200, for example, which is obtained by ring opening polymerization of an alkylene oxide by use of an alkali catalyst or a cationic catalyst with a monohydric or polyhydric alcohol such as methanol, ethanol, ethylene glycol, propylene glycol, diethylene glycol, trimethylolpropane or glycerin. The number of hydroxyl groups is preferably from 2 to 8, particularly preferably from 2 to 3. The hydroxyl value is preferably from 10 to 120, particularly preferably from 20 to 75.

The alkylene oxide is preferably one having at least 3 carbons, and specific examples of the alkylene oxide include propylene oxide, 1,2-butylene oxide, 2,3-butylene oxide, epichlorohydrine, oxetane, tetrahydrofuran, and so on. These can be used in combination of at least two kinds. Propylene oxide is preferred.

As described above, the polyether monool or polyol used as the dispersion medium can also be used as the initiator in the ring opening polymerization of the alkylene oxide.

The content of the double metal cyanide complex catalyst in the catalyst-containing composition of the present invention is preferably from 5 to 30% by mass, more preferably from 5 to 20% by mass and most preferably from 5 to 10% by mass. Here, the content of the double metal cyanide complex catalyst in the catalyst-containing composition can be calculated from the content of the double metal cyanide complex in the filter cake used for producing the catalyst-containing composition. The content of the double metal cyanide complex in the filter cake will be described later.

(Production Process)

The double metal cyanide complex catalyst according to the present invention is preferably produced by the process including the following steps.

(1) a step (a) of merging a continuous flow of an aqueous solution of a metal halide compound and a continuous flow of an aqueous solution of an alkali metal cyanometalate in such a proportion that an atomic number ratio of (metal atoms in the metal halide compound)/(metal atoms other than an alkali metal in the alkali metal cyanometalate) is in a range of from 5 to 16, and transferring a merged liquid to a first reactor mentioned below, (2) a step (b) of retaining the merged liquid in the first reactor under stirring at a temperature of from 0 to 90° C. for an average residence time of at least 1 minute to react the metal halide compound with the alkali metal cyanometalate, and continuously transferring a reaction product liquid to a second reactor mentioned below, (3) a step (c) of continuously introducing a flow of an organic ligand or an aqueous solution of an organic ligand into the second reactor, retaining a mixture of the organic ligand or the aqueous solution of the organic ligand with the reaction product liquid in the second reactor under stirring at a temperature of from 40 to 100° C. for an average residence time of at least 3 minutes, and continuously transferring a dispersion liquid containing a resultant double metal cyanide complex catalyst to the following step (d), and (4) the step (d) of filtering the dispersion liquid containing the double metal cyanide complex catalyst to obtain a filter cake containing the double metal cyanide complex catalyst.

The metal in the metal halide compound is preferably one of those exemplified as the above $M^1$. The metal halide compound is preferably $ZnCl_2$ or $FeCl_2$. The concentration of the aqueous solution of the metal halide compound is preferably at least 10% by mass, particularly preferably at least 50% by mass. On the other hand, the concentration is preferably not more than the saturated concentration. In the concentration range of less than the above predetermined concentration, the double metal cyanide complex obtained is highly crystalline, and the catalytic activity degrades. On the other hand, if the process is carried out in the concentration beyond the saturated concentration, the mixing condition of the solutions becomes uneven, thereby also obtaining the double metal cyanide complex with low catalytic activity.

The metal constituting the cyanometalate in the alkali metal cyanometalate (namely, the metal other than the alkali metal) is preferably one of the metals exemplified as the above $M^2$. The concentration of the aqueous solution of the alkali metal cyanometalate is preferably at most 50% by mass, particularly preferably at most 20% by mass. On the other hand, the concentration is preferably at least 2% by mass. If the process is carried out in a concentration over the predetermined concentration, an alkali metal cyanometalate-excess region is locally formed in a portion in contact with the aqueous solution of the metal halide compound to bring about the same effect as in the case where the metal halide concentration is low, whereby the catalytic activity degrades. On the other hand, if the process is carried out under the condition of a too low concentration, the catalytic activity degrades.

A preferable operation in the above step (a) is such that continuous flows of respective aqueous solutions from a storage tank of the aqueous solution of the metal halide compound and from a storage tank of the aqueous solution of the alkali metal cyanometalate are merged in a conduit connected to the first reactor and the merged liquid is immediately introduced to the first reactor. If the flow volume of the two flows is high, a mixing means may be provided in the conduit so that the two flows can be uniformly mixed ahead of the first reactor. It is preferable to control the temperature of each aqueous solution at a desired temperature. Particularly, it is preferable to control the temperatures at a constant temperature of not more than the reaction temperature in the step (b) described below.

The atomic number ratio of (metal atoms in the metal halide compound)/(metal atoms other than the alkali metal in the alkali metal cyanometalate), i.e., the atomic number ratio of the above-mentioned metal $M^1$/the above-mentioned metal $M^2$ needs to be from 5 to 16. The applicant has already proposed this step (Patent Document 7), but has not proposed the atomic number ratio of $M^1/M^2$ in a specific range, yet. If the atomic number ratio is larger than 16, the metal halide compound becomes wasted, thereby increasing cost of the catalyst. On the other hand, if the atomic number ratio is smaller than 5, catalyst particles with good filterability cannot be obtained. The atomic number ratio of $M^1/M^2$ is particularly preferably from 8 to 12. When a metal halide compound having one $M^1$ in one molecule and an alkali metal cyanometalate having one $M^2$ in one molecule are used, the atomic number ratio of $M^1/M^2$ corresponds to a molar ratio of (metal halide compound)/(alkali metal cyanometalate).

In the step (b), the metal halide compound and the alkali metal cyanometalate in the merged liquid are reacted under stirring at the temperature of from 0 to 90° C. in the first reactor. The first reactor normally has a stirring means and a temperature-controlling means. The temperature in the first reactor is preferably from 10 to 70° C. If the reaction temperature is outside the above range, the process will fail to obtain the catalyst with high activity. Particularly, the temperature in the first reactor is preferably maintained at a constant temperature within the range of from 10 to 70° C.

There are no particular restrictions on the temperatures of the respective aqueous solutions of the metal halide compound and the alkali metal cyanometalate in the step (a) as long as the temperature of the reaction in the first reactor is controlled at a predetermined temperature selected within the above temperature range.

Furthermore, the average residence time in the first reactor is at least 1 minute. If the average residence time is set longer, the productivity of the catalyst becomes low and the production cost becomes high even though there is no disadvantage on the catalytic activity. The average residence time is more preferably from 3 minutes to 120 minutes, particularly preferably from 5 minutes to 60 minutes. Accordingly, as long as a catalyst with a desired catalytic activity can be obtained, it is preferable to adopt a relatively short average residence time within the above range.

Here, the average residence time means a value obtained by dividing the volume of the liquid in the first reactor by an introduction rate of the liquid introduced thereinto (volume/time). The volume of the liquid in the first reactor refers to the volume of the liquid under stirring in the first reactor. The average residence time in the second reactor described below is also used in the same meaning.

In the step (b), the metal halide compound and the alkali metal cyanometalate are reacted to form a double metal cyanide and to precipitate fine particles of the double metal cyanide in the liquid. The reaction product liquid discharged from the step (b) is a dispersion liquid in which fine particles of the double metal cyanide are dispersed in water, and this reaction product liquid contains a by-product of an alkali metal halide and an excessive amount of the metal halide compound other than the double metal cyanide. It is considered that almost all of the alkali metal cyanometalate reacts, and the amount of unreacted alkali metal cyanometalate is small in the reaction product liquid.

The reaction product liquid formed in the step (b) is discharged from the first reactor and continuously transferred to the second reactor. The discharge rate of the reaction product liquid is normally the same as the introduction rate of the merged liquid introduced into the first reactor, whereby the volume of the liquid in the first reactor is maintained constant.

In the step (c), the reaction product liquid transferred from the first reactor, and the organic ligand or the aqueous solution of the organic ligand (both of which will be collectively referred to hereinafter as a ligand liquid) are introduced into the second reactor. The reaction product liquid is continuously introduced into the second reactor and the ligand liquid is also continuously introduced in accordance therewith. The second reactor normally has a temperature controlling means and a stirring means as the first reactor does. The reaction product liquid and the ligand liquid can be introduced separately as their respective flows into the second reactor, or the flow of the reaction product liquid and the flow of the ligand liquid can be so introduced that they are merged in a conduit connected to the second reactor and the merged liquid is introduced into the second reactor. The mixture of the reaction product liquid and the ligand liquid is retained in the second reactor under stirring at the predetermined temperature for the predetermined period of time, and the double metal cyanide is coordinated with the organic ligand in the mixture to form a double metal cyanide complex.

The reaction temperature in the second reactor needs to be from 40 to 100° C. If the reaction temperature is less than 40° C., the particle size of the double metal cyanide complex produced is small and the filterability is low, so as to fail to obtain the double metal cyanide complex meeting the object of the present invention. On the other hand, if the reaction temperature exceeds 100° C., the catalytic activity of the double metal cyanide complex tends to degrade. The reaction temperature is preferably from 50 to 90° C., more preferably from 60 to 70° C. It is preferable to maintain the reaction temperature at a predetermined temperature within the range.

The average residence time in the second reactor is at least 3 minutes, preferably at least 5 minutes, and more preferably from 10 minutes to 120 minutes, and particularly preferably from 10 minutes to 60 minutes. Just as in the case of first reactor, there is no disadvantage on the catalyst performance even if the average residence time is set long, but it will result in decrease of productivity of the catalyst and increase of production cost. Accordingly, as long as the catalyst with a desired catalytic activity can be obtained, it is preferable to adopt a relatively short average residence time within the above range.

As described above, the organic ligand applicable is either t-butyl alcohol alone or a combination of t-butyl alcohol with another compound. In the case of the combination being used, the ratio of t-butyl alcohol to the total amount of t-butyl alcohol and the organic ligand other than t-butyl alcohol is preferably from 50 to 100% by mass. The organic ligand only can be introduced into the second reactor, or an aqueous solution of the organic ligand in a desired concentration can be introduced into the second reactor.

The amount of the ligand liquid introduced into the second reactor, as an amount of the organic ligand, is preferably in a mass ratio of from 1 to 100 to the amount of the double metal cyanide in the reaction product liquid introduced. The amount of the organic ligand is more preferably in a mass ratio of from 1 to 50, most preferably from 1 to 20. If the amount of the organic ligand is less than the mass ratio of 1 relative to the amount of the double metal cyanide, the process will fail to obtain the catalyst with adequately high activity. On the other hand, if the amount exceeds the mass ratio of 100, recovery cost of the organic ligand will become high, which is not economical. Here the amount of the double metal cyanide in the reaction product liquid is calculated as a mass of $M^1{}_a[M^2{}_f(CN)_g]_b$ converted from the amount of the alkali metal cyanometalate under the assumption that all the amount of the alkali metal cyanometalate used as the raw material reacts to be converted into the double metal cyanide.

On the other hand, the amount of the organic ligand introduced into the second reactor is preferably within the above range and the concentration of the organic ligand in the mixture in the second reactor is preferably from 15 to 50% by mass. If the concentration of the organic ligand is outside the range, the catalytic activity of the double metal cyanide complex obtained might degrade. Particularly, if the concentration of the organic ligand is too high, the by-product alkali metal halide in the mixture reduces its solubility because of decrease in the amount of water to precipitate in the double metal cyanide complex, so as to raise the possibility of degradation of the catalytic activity. In addition, there is also a possibility of degradation of the catalytic activity due to an excessive amount of the metal halide compound ($M^1_hX_i$) remaining in the double metal cyanide complex.

In the step (c), the organic ligand coordinates to the double metal cyanide to form a double metal cyanide complex. The dispersion liquid discharged from the step (c) is a dispersion liquid in which fine particles of the double metal cyanide complex are dispersed in water, and this dispersion liquid contains the by-product alkali metal halide, an excessive amount of the metal halide compound, and so on having existed in the reaction product liquid introduced from the step (b), in addition to the double metal cyanide complex.

The dispersion liquid formed in the step (c) is continuously discharged from the second reactor and transferred to the step (d). The discharging rate of the dispersion liquid is the same as the total introducing rate of the reaction product liquid and the ligand liquid introduced into the second reactor, so that the volume of the liquid in the second reactor can be maintained constant.

The dispersion liquid discharged from the second reactor in the step (d) is filtered to obtain the filter cake. The filtration in the step (d) does not have to be continuously carried out, and the dispersion liquid accumulated in a predetermined amount may be filtered on a batch basis. The accumulation temperature in the case of accumulating the dispersion liquid is within the reaction temperature range in the step (c) or below the range, and it is normally accumulated at room temperature. The filtration removes water and components dissolved in water (a metal halide compound, an excess organic ligand, and so on), and the particles of the double metal cyanide complex are obtained as a filter cake.

It is considered that substantially all the solid particles in the dispersion liquid are recovered in the filter cake by the filtration, but some of very fine particles possibly remain not recovered depending on conditions. In the present invention, it is preferable to obtain the filter cake by use of a filtering material having a retained particle size of at least 1 μm. The filtering material is preferably a filter paper or a filter cloth. It is preferable to carry out the filtration under a pressure of from 0.05 to 1 MPa. Among the particles of the double metal cyanide complex in the dispersion liquid discharged from the step (c), there are a few very fine particles, and the average particle size is large, as illustrated on the above double metal cyanide complex catalyst, whereby the filterability of the dispersion liquid is good. Thus, the filter cake having a small liquid content can be readily obtained in a short period of time.

The filter cake obtained in the step (d) is composed of the double metal cyanide complex particles and residual liquid components, and the residual liquid components are mainly water and the organic ligand. The by-product alkali metal halide and the metal halide compound used excessively are dissolved in the residual liquid components, and these impurities sometimes adhere to the surfaces of the double metal cyanide complex particles. In order to remove those impurities, it is preferable to wash and purify the resulting filter cake with a washing liquid. It is not preferable to dry the filter cake in order to remove the residual liquid components, as described above. The washing liquid is preferably an aqueous solution of an organic ligand. A concentration of the organic ligand in the aqueous solution of the organic ligand as the washing liquid is preferably from 10 to 50% by mass. If the aqueous solution of the organic ligand in a concentration of less than 10% or water only is used as the washing liquid, the amount of the organic ligand coordinated to the double metal cyanide complex and the amount of the metal halide compound ($M^1_hX_i$) will change, which might degrade the catalytic activity. If the aqueous solution of the organic ligand in a concentration exceeding 50% is used as the washing liquid, removal of the by-product alkali metal halide tends to be inadequate, which might degrade the catalytic activity. Moreover, the organic ligand used for the washing liquid may be the same as or different from the organic ligand used in the step (d).

The washing is preferably carried out by a step of mixing the filter cake obtained in the step (d) and the washing liquid to obtain a mixture, stirring the mixture for a predetermined period of time at a temperature of from 0 to 100° C., preferably from room temperature to 50° C., and thereafter filtering (this step will be referred to as a step (e)). The filter cake obtained in the step (e) will be referred to hereinafter as a second filter cake. Furthermore, the filter cake obtained in the step (d) will be referred to hereinafter as a first filter cake.

The washing can be repeated multiple times. The step (e) of the second or subsequent washing will be referred to as a step (e'), and a filter cake obtained in each step (e') will be referred to as the third or subsequent filter cake. In the step (e') or subsequent washing step, the concentration of the organic ligand in the washing liquid is preferably higher than that of the organic ligand in the step (e), and the organic ligand can also be used alone as the washing liquid. In the step (e'), the concentration of the organic ligand in the aqueous solution of the organic ligand as the washing liquid is preferably at least 50% by mass. Accordingly, the concentration of the organic ligand in the washing liquid in the step (e') is preferably from 50 to 100% by mass, particularly preferably from 80 to 100% by mass. If the concentration of the organic ligand in the washing liquid in the step (e') is low, the washing will decrease the coordination amount of the metal halide compound ($M^1_hX_i$) in the double metal cyanide complex, so as to degrade the catalytic activity possibly.

The washing in the step (e) and the washing in the step (e') can be carried out in the same conditions except for the difference in the concentration of the organic ligand in the washing liquid. The step (e) will be explained below including the step (e').

There are no particular restrictions on the amount of the washing liquid used in the step (e), and the amount is preferably in a mass ratio of approximately from 1 to 20 to the filter cake from the viewpoint of washing efficiency and economical efficiency. The washing liquid is mixed into the filter cake and the mixture is stirred at a predetermined temperature for a predetermined period of time, and then filtered to obtain a next filter cake. The temperature in the step (e) is in a range of from 0 to 100° C., particularly from room temperature to 50° C., and room temperature is normally adopted. There are no particular restrictions on the period for maintaining the dispersion state, and the period normally adopted is from 1 to 100 minutes, particularly from 10 to 30 minutes. Appropriate conditions for the filtration (the filtering material to be used, and others) in the step (e) are the same as those in the step (d). Since the particles of the double metal cyanide complex in the step (e) include few fine particles and have the large average particle size as those in the step (d), the filterability thereof is good and the filter cake having a small liquid content can be readily obtained in a short period of time.

The purification by washing improves the activity of the double metal cyanide complex as the catalyst. Thus, it is preferable to purify the filter cake obtained in the step (d), by at least one washing and to use it as the catalyst. Namely, it is preferable to use the second or subsequent filter cake as the catalyst. Furthermore, it is also preferable to use the second or subsequent filter cake in production of the catalyst-containing composition as described later.

Each of the filter cakes including the first filter cake, contains a high concentration of double metal cyanide complex particles. The content of the double metal cyanide complex particles in each filter cake is normally from 20 to 60% by mass, preferably from 25 to 40% by mass. In the cases of the t-butyl alcohol-coordinated double metal cyanide complexes produced by the conventional methods, the content of the double metal cyanide complex particles in the filter cake is normally less than 20% by mass because of poor filterability. Here the content of the double metal cyanide complex particles in the filter cake means a remaining amount (%) obtained after drying of the filter cake at about 80° C. and under at most 0.01 MPa for 5 hours.

Each of the filter cakes including the first filter cake, can be used as a ring opening polymerization catalyst for an alkylene oxide as it is in the form of the double metal cyanide complex catalyst in the wet condition. The above-mentioned catalyst-containing composition can be produced by dispersing each filter cake in a polyether monool or a polyether polyol as a dispersing medium, as described below. A catalyst with high activity having a specific particle size distribution according to the present invention can hardly be obtained by a method of drying the resulting filter cake and thereafter pulverizing it. Where each filter cake is directly used as an alkylene oxide ring opening polymerization catalyst, it is preferable to remove the water and the organic ligand from the cake right before it is used as the catalyst. It is particularly preferable to remove these volatile components by heating under a reduced pressure or the like, after mixing the filter cake with an initiator, and then to initiate the reaction of the alkylene oxide.

(Catalyst-Containing Composition)

The above-mentioned catalyst-containing composition can be produced by dispersing the filter cake obtained in the above step, in a polyether monool or a polyether polyol as a dispersion medium. Particularly, it is preferable to produce the catalyst-containing composition by dispersing the filter cake in the dispersion medium and thereafter removing the volatile components therefrom. The step of removing the volatile components removes water and the organic ligand (which is not coordinated to the double metal cyanide complex) contained in the filter cake to obtain the catalyst-containing composition without components unnecessary for production of a polyether. Water and a hydroxyl-containing organic ligand (t-butyl alcohol, or the like) remaining in the filter cake can possibly react with the alkylene oxide. Moreover, the catalyst-containing composition can also be produced by mixing the first filter cake or the second or subsequent filter cake with the above-mentioned washing liquid, thereafter adding thereto the above-mentioned dispersion medium, and then removing the volatile components (water and the organic ligand) by heating under a reduced pressure, or the like.

The filter cake and the dispersion medium are mixed by an ordinary mixer so that the double metal cyanide complex particles can be readily dispersed in the dispersion medium. The volatile components are preferably removed by heating at a temperature of from 40 to 120° C. under a reduced pressure (at most 0.01 MPa).

By virtue of the production through the above-mentioned steps, the double metal cyanide complex having the aforementioned specific average particle size and volume percentage can be obtained even though it is the double metal cyanide complex coordinated with t-butyl alcohol. With respect to the conventional glyme-type DMC catalysts, the DMC catalysts with high crystallinity and large particle size can be produced regardless of their production methods. Therefore, there is little significance in producing the glyme-type DMC catalysts through the use of the above-mentioned process.

Particles of the catalyst of large average particle size can possibly be produced by a process of, after production of the double metal cyanide complex, drying it into powder and then pulverizing the powder. However, the pulverization requires a lot of time and labor and the resultant powder has a wide particle size distribution in a state of mixture of particles of particle sizes of at most 1 µm and heterogeneous particles of particle sizes of from 20 to a few hundred µm. It is, therefore, difficult to obtain the double metal cyanide complex having a narrow particle size distribution.

Furthermore, when the powder obtained by the above pulverization method is dispersed in a dispersion medium, particles are likely to aggregate because of poor dispersibility of particles, whereby the average particle size of the particles becomes larger than 20 µm and it is thus difficult to obtain the catalyst-containing composition of the present invention.

Furthermore, in a case where a polyether is produced by use of the specific catalyst of the present invention, it provides the effect of obtaining the polyether having a narrow molecular weight distribution and a low viscosity. On the other hand, in a case where a polyether is produced by use of the powder obtained by the above pulverization method, as the catalyst, it is difficult to obtain a polyol having a narrow molecular weight distribution and a low viscosity. It is conceivably because the catalytic activity is degraded by change in the structure, composition and aggregation condition of the double metal cyanide complex in the method of once drying the catalyst and then pulverizing it into powder.

(Production Process of Polyether)

The present invention also provides a process for producing a polyether, comprising subjecting an alkylene oxide to ring opening polymerization with an initiator in the presence of the double metal cyanide complex catalyst. The polyether stated herein is a generic term for polyether monools and polyether polyols.

According to the present invention, the above filter cake can be used as it is in the wet condition, and the above catalyst-containing composition is also used as it is. With use of the double metal cyanide complex in them as a catalyst, the alkylene oxide can undergo ring opening polymerization. As described above, when they contain the organic ligand and water, it is preferable to use them after removing the organic ligand and water without drying them.

A temperature of the polymerization is preferably from 60 to 180° C., more preferably from 90 to 150° C. and most preferably from 100 to 140° C.

The initiator can be one similar to the polyether monools and polyether polyols applicable as the dispersion medium for production of the above catalyst-containing composition. The number of hydroxyl groups in the initiator is preferably from 1 to 12, more preferably from 2 to 4 and most preferably from 2 to 3.

The initiator preferably has a hydroxyl value from 2 to 15 times as many as that of the polyether to be produced, more preferably from 3 to 10 times. The hydroxyl value itself is preferably from 70 to 300.

The polyether monool or the polyether polyol as the initiator may be supplied singly or together with an alkylene oxide to the reaction system on the way of the polymerization reaction. Examples of the initiator which can be supplied on the way of the polymerization reaction include the aforementioned low-molecular-weight polyether monools and polyether polyols and also include water and particularly low-molecular-weight polyols such as glycerin, trimethylolpropane, propylene glycol, ethylene glycol, dipropylene glycol and diethylene glycol.

The alkylene oxide applicable herein can be one similar to those exemplified as the alkylene oxide for producing the initiator. Furthermore, ethylene oxide, which is an alkylene oxide having two carbons, hardly undergoes polymerization by itself, but it can undergo polymerization in a manner of mixing it with an alkylene oxide having at least 3 carbons and adding the mixture to the polymerization system. The alkylene oxide particularly preferably applicable is propylene oxide alone or a combination of propylene oxide and ethylene oxide.

In the present invention, there are no particular restrictions on the amount of the catalyst used in the production of the polyether, but the amount of the catalyst based on the double metal cyanide complex is normally preferably from 3 to 500 ppm, more preferably from 5 to 100 ppm, and particularly preferably from 10 to 50 ppm, relative to the polyether finally produced.

Concerning the introduction of the catalyst to the polymerization system, the catalyst may be initially introduced all at once, or may be successively introduced on a batch basis. From the viewpoint of the introduction of the catalyst to the polymerization system, it is easier to use the catalyst-containing composition than to use the filter cake as it is.

The catalyst according to the present invention has a high activity and a long catalytic life as a catalyst for ring opening polymerization of an alkylene oxide, and it is thus feasible to reduce the amount of the catalyst remaining in the polyether after completion of the reaction. In addition, the polyether after completion of the reaction may be used as it is without removing the catalyst. Needless to say, removal of the catalyst may be carried out by any of various conventionally known methods, depending upon purposes of use.

With use of the catalyst according to the present invention, a side reaction is suppressed, and it is also possible to produce a high-molecular-weight polyether having a low total unsaturation degree. The total unsaturation degree is preferably from 0.001 to 0.03 meq/g, more preferably from 0.003 to 0.01 meq/g.

The hydroxyl value of the polyether to be produced is preferably at most 60, more preferably at most 28. It is particularly preferably at most 24, and most preferably at most 18. The hydroxyl value is preferably at least 2, particularly preferably at least 5.

The polyether produced by use of the catalyst according to the present invention has such effects that the molecular weight distribution is narrow and the viscosity is low even though it has a high molecular weight. Furthermore, the amount of the catalyst used can be reduced because of its high catalytic activity. The molecular weight distribution (Mw/Mn) referred to in the present invention is a polystyrene-based distribution measured by means of gel permeation chromatography (GPC) at room temperature, using tetrahydrofuran as a solvent.

(Application)

The polyether polyol obtained by the above process is applicable to polyurethane raw materials for polyurethane foams, polyurethane elastomers, and so on, and to raw materials for adhesives, paints, and so on. Furthermore, the polyether monools and the polyether polyols obtained by the above process are applicable to surfactants, and functional oils such as lubricants. Moreover, they are applicable to use as sealants by modifying the terminal hydroxyl groups to another functional groups.

They are preferably used for polyurethane foams. In this case, they can also be used in the form of polymer-dispersed polyols containing fine particles of polymers. They are particularly preferably used for flexible polyurethane foams.

When the polyether polyols are used as polyurethane raw materials such as polyurethane foams, it is preferably used after ring opening addition polymerization of ethylene oxide with an alkali catalyst or the like to the terminals of the polyether polyols obtained by the above process.

EXAMPLES

Now, the present invention will be explained in further detail with reference to examples and comparative examples. However, it should be understood that the present invention is by no means restricted to such specific examples.

The average particle sizes of catalyst particles and the ratios of catalyst particles in the particle size range of at least 0.15 μm and at most 1 μm among the particles in the particle size range of at least 0.15 μm (hereinafter referred to as the ratios of particles of the particle sizes of from 0.15 to 1 μm), contained in filter cakes, catalyst-containing compositions (hereinafter referred to as catalyst slurries) and a sample such as a dried solid (Example 5) as obtained in examples below, were measured by the Microtrac particle size analyzer (FRA-9220 manufactured by NIKKISO CO, LTD). However, the measurement was carried out in such a way that each sample was used as preliminarily dispersed in methanol, and that methanol was used as a circulating solvent.

The "filtration" was conducted under a pressure of 0.25 MPa, using a circular filter plate with a diameter of 250 mm and a filter paper for quantitative analysis of fine particles (No. 5C manufactured by ADVANTEC TOYO KAISHA, LTD., retained particle size of 1 μm (calculated from filter leakage particle sizes obtained when barium sulfate or the like defined by JIS P 3801 was naturally filtered)).

The content of double metal cyanide complex particles in a filter cake is a remaining amount obtained after drying a part of the filter cake at 80° C. and under at most 0.01 MPa for 5 hours.

Polyol R1 is a poly oxypropylene polyol with a hydroxyl value of 74.8 (molecular weight: 1500) obtained by addition polymerization of propylene oxide (hereinafter referred to as PO) to dipropylene glycol. Polyol R2 is a poly oxypropylene polyol with a hydroxyl value of 168 (molecular weight: 1000) obtained by addition polymerization of PO to glycerin. Example 1 Production of Filter Cake and Catalyst Slurry Containing Double Metal Cyanide Complex Example 1-1

An aqueous solution of zinc chloride in a concentration of 67% by mass was introduced into one of branched conduits connected to a first reactor (inner volume: 600 ml) and an aqueous solution of potassium hexacyanocobaltate ($K_3CO(CN)_6$) in a concentration of 5.5% by mass was introduced into the other. The two flows were merged at the branch portion just before the first reactor, and the merged liquid was introduced into the first reactor. The aqueous solution of zinc chloride was continuously supplied at a rate of 12.3 g/min (6.83 ml/min based on the specific gravity of 1.80 g/ml) and the aqueous solution of potassium hexacyanocobaltate was continuously supplied at a rate of 31.5 g/min (31.5 ml/min based on the specific gravity of 1.0 g/ml), from each storage tank by a pump (in the atomic number ratio Zn/Co of 11.5). The liquid was stirred at 300 rpm by a stirrer in the first reactor kept at 40° C., and then the reaction product liquid was introduced through a conduit from the first reactor to a second reactor kept at 60° C.

An average residence time in the first reactor was 15.7 minutes. Here the average residence time is a value obtained by dividing a volume of a portion in the first reactor where the stir was sufficiently conducted (600 ml), by the rate of the liquid supplied thereinto (38.3 ml/min).

An aqueous solution of 50% by mass of t-butyl alcohol (hereinafter referred to as TBA) as an aqueous solution of an organic ligand was supplied at a rate of 63.2 g/min (71.0 ml/min based on the specific gravity of 0.89 g/ml) into the second reactor (inner volume: 2300 ml) at the same time as the reaction liquid was. The liquid was stirred at 300 rpm by a stirrer in the second reactor and the dispersion liquid produced in the second reactor was transferred through a conduit from the second reactor to a storage tank and stored therein.

An average residence time in the second reactor was 21.5 minutes. Here the average residence time is a value obtained by dividing a volume of a portion in the second reactor where the stir was sufficiently conducted (2300 ml), by the rate of the liquid supplied thereinto (109.3 ml/min). The ratio of TBA under a steady state condition was 29.5% by mass relative to the amount of the liquid in the second reactor. Furthermore, the amount of TBA introduced corresponds to about 9.7 times the mass of zinc hexacyanocobaltate ($Zn_3[Co(CN)_6]_2$) which is converted from the amount of potassium hexacyanocobaltate used as the raw material.

Next, filtration was conducted for 1100 g of the dispersion liquid accumulated in the storage tank, and a filter cake (A1) containing a zinc hexacyanocobaltate-TBA complex (hereinafter referred to as a DMC-TBA catalyst) was separated in about 25 minutes.

112 g of the filter cake (A1) and 500 g of a 30-mass % TBA aqueous solution were mixed at room temperature and stirred at 300 rpm for 1 hour. Then filtration was conducted to separate a filter cake (A2) containing the DMC-TBA catalyst in about 20 minutes.

30 g of the filer cake (A2) was mixed with 90 g of the polyol R1 and the mixture was stirred at room temperature for 3 hours. Then volatile components such as the excess organic ligand and water were removed at 80° C. and under a reduced pressure of 0.005 MPa for 5 hours to obtain a DMC-TBA catalyst slurry (catalyst slurry (A2-S)).

Example 1-2

A DMC-TBA catalyst slurry (catalyst slurry (A1-S)) was obtained in the same manner as in Example 1-1 except that the filter cake (A1) was used instead of the filter cake (A2).

Example 1-3

A DMC-TBA catalyst slurry (catalyst slurry (A2-T)) was obtained in the same manner as in Example 1-1 except that the removal step of the volatile components with heating under a reduced pressure was not carried out after mixing the filter cake (A2) with the polyol R1.

Example 2

Production of Filter Cake and Catalyst Slurry Containing Double Metal Cyanide Complex Example 2-1

The same operation as in Example 1-1 was carried out except that an aqueous solution of mixture of ethylene glycol mono-t-butyl ether (hereinafter abbreviated as ETBE) and TBA (10% by mass and 40% by mass, respectively) was used as the aqueous solution of the organic ligand supplied to the second reactor. Filtration was conducted for 1100 g of the dispersion liquid accumulated in the storage tank, and a filter cake (B1) containing a zinc hexacyanocobaltate-TBA/ETBE complex (hereinafter referred to as a DMC-TBA/ETBE catalyst) was separated in about 30 minutes.

108 g of the filter cake (B1) and 500 g of a 30-mass % TBA/ETBE aqueous solution of mixture were mixed at room temperature and stirred at 300 rpm for 1 hour. Then filtration was conducted to separate a filter cake (B2) containing the DMC-TBA/ETBE catalyst in about 25 minutes. A DMC-TBA/ETBE catalyst slurry (catalyst slurry (B2-S)) was obtained in the same manner as in Example 1-1 using a part of the filter cake (B2) and the polyol R1.

Example 2-2

A DMC-TBA/ETBE catalyst slurry (catalyst slurry (B1-S)) was obtained in the same manner as in Example 2-1 except that the filter cake (B1) was used instead of the filter cake (B2).

Example 3

Production of Filter Cake and Catalyst Slurry Containing Double Metal Cyanide Complex The same operation as in Example 1-1 was carried out except that an aqueous solution of zinc chloride in a concentration of 67% by mass and an aqueous solution of potassium hexacyanocobaltate in a concentration of 5.5% by mass were supplied at rates of 6.6 g/min (3.67 ml/min based on the specific gravity of 1.80 g/ml) and 31.5 g/min (31.5 ml/min based on the specific gravity of 1.0 g/ml), respectively (in the atomic number ratio Zn/Co of 6.2). Filtration was conducted for 1100 g of the dispersion liquid accumulated in the storage tank, and a filter cake (C1) containing a DMC-TBA catalyst was separated in about 28 minutes.

110 g of the filter cake (C1) and 500 g of a 30-mass % TBA aqueous solution were mixed at room temperature and stirred at 300 rpm for 1 hour. Then filtration was conducted to separate a filter cake (C2) containing a DMC-TBA catalyst in about 23 minutes. A DMC-TBA catalyst slurry (catalyst slurry (C2-S)) was obtained in the same manner as in Example 1-1 using the filter cake (C2) and the polyol R1. An average residence time in the first reactor was 17.1 minutes and an average residence time in the second reactor was 21.7 minutes.

Example 4

Comparative Example

Example 4-1

316 g of an aqueous solution of zinc chloride in a concentration of 67% by mass was charged in a reactor (5 liters) kept in a hot-water bath at 40° C. and an aqueous solution of potassium hexacyanocobaltate in a concentration of 5.5% by mass was supplied at a rate of 27 g/min from a storage tank by a pump (in the atomic number ratio Zn/Co of 11.5) for 30 minutes, while stirring the solution at 300 rpm by a stirrer, and the stir was further continued for 60 minutes to form a dispersion liquid of a double metal cyanide. Then the temperature inside the reactor was increased to 60° C., and a 50-mass % TBA aqueous solution was introduced at a rate of 53 g/min for 30 minutes under stirring at 300 rpm. A ratio of TBA relative to the dispersion liquid of the double metal cyanide complex in the reactor was 30% by mass. The stir was further continued for 60 minutes and the reaction was completed. Then filtration was conducted for 1100 g of the resultant dispersion liquid to separate a filter cake (D1) containing a DMC-TBA catalyst in about 240 minutes.

105 g of the filter cake (D1) and 500 g of a 30-mass % TBA aqueous solution were stirred at room temperature at 300 rpm for 1 hour. Then filtration was conducted to separate a filter cake (D2) containing the DMC-TBA catalyst in about 210 minutes. A DMC-TBA catalyst slurry (catalyst slurry (D2-S)) was obtained in the same manner as in Example 1-1 using the filter cake (D2) and the polyol R1.

Example 4-2

A DMC-TBA catalyst slurry (catalyst slurry (D1-S)) was obtained in the same manner as in Example 4-1 except that the filter cake (D1) was used instead of the filter cake (D2).

Example 4-3

A catalyst slurry (catalyst slurry (D2-T)) was obtained in the same manner as in Example 4-1 except that the removal step of the volatile components with heating under a reduced pressure was not carried out after mixing the filter cake (D2) with the polyol R1.

Example 5

Comparative Example

A part (60 g) of the filter cake (A2) obtained in Example 1-1 was dried at 80° C. and under 0.005 MPa for 5 hours to obtain a solid and the solid was pulverized to obtain a solid catalyst (E1) in a form of dry powder having an average particle size of 22.5 µm.

Example 6

Comparative Example

The same operation as in Example 1-1 was carried out except that an aqueous solution of zinc chloride in a concentration of 67% by mass and an aqueous solution of potassium hexacyanocobaltate in a concentration of 5.5% by mass were supplied at rates of 4.4 g/min (2.44 ml/min based on the specific gravity of 1.80 g/ml) and 31.5 g/min (31.5 ml/min based on the specific gravity of 1.0 g/ml), respectively from each storage tank by a pump in the atomic number ratio Zn/Co of 3.9. An average residence time in the first reactor was 17.7 minutes and an average residence time in the second reactor was 21.9 minutes. Filtration was conducted for 1100 g of the dispersion liquid accumulated in the storage tank, and a filter cake (F1) containing a DMC-TBA catalyst was separated in about 115 minutes.

108 g of the filter cake (F1) and 500 g of a 30-mass % TBA aqueous solution were mixed at room temperature and stirred at 300 rpm for 1 hour. Filtration was conducted to separate a filter cake (F2) containing the DMC-TBA catalyst in about 105 minutes. A DMC-TBA catalyst slurry (catalyst slurry (F2-S)) was obtained in the same manner as in Example 1-1 using the filter cake (F2) and the polyol R1.

Example 7

Comparative Example

The same operation as in Example 1-1 was carried out except that the first reactor and the second reactor were kept at room temperature. Filtration was conducted for 1100 g of the dispersion liquid accumulated in the storage tank and a filter cake (G1) containing a DMC-TBA catalyst was separated in about 120 minutes.

110 g of the filter cake (G1) and 500 g of a 30-mass % TBA aqueous solution were mixed at room temperature and stirred at 300 rpm for 1 hour. Then filtration was conducted to separate a filter cake (G2) containing the DMC-TBA catalyst in about 103 minutes. A DMC-TBA catalyst slurry (catalyst slurry (G2-S)) was obtained in the same manner as in Example 1-1 using the filter cake (G2) and the polyol R1.

Table 1 shows, for each of the above examples, the catalyst content in the resultant filter cake, the average particle size of catalyst particles in the filter cake, and the content of particles in the particle size range of from 0.15 to at most 1 µm. Table 2 shows the catalyst content in the catalyst slurry, the average particle size of catalyst particles in the catalyst slurry and the content of particles in the particle size range of from 0.15 to at most 1 µm, and evaluation of the fluidity. Furthermore, Table 1 also shows the average particle size and the content of particles in the particle size range of from 0.15 to at most 1 µm, of the dried solid catalyst (E1).

TABLE 1

|  | Catalyst content (% by mass) | Average particle size (µm) | Content of particles in particle size range of 0.15–1 µm (% by volume) |
|---|---|---|---|
| Filter cake (A1) | 29.0 | 8.9 | Not detected |
| Filter cake (A2) | 28.0 | 7.8 | Not detected |

TABLE 1-continued

| | Catalyst content (% by mass) | Average particle size (μm) | Content of particles in particle size range of 0.15–1 μm (% by volume) |
|---|---|---|---|
| Filter cake (B1) | 30.0 | 10.2 | Not detected |
| Filter cake (B2) | 29.0 | 9.2 | Not detected |
| Filter cake (C1) | 27.5 | 6.9 | Not detected |
| Filter cake (C2) | 28.3 | 7.3 | Not detected |
| Filter cake (D1) | 15.0 | 2.3 | 30 |
| Filter cake (D2) | 16.0 | 2.5 | 33 |
| Dry solid (E1) | — | 22.5 | At most 5 |
| Filter cake (F1) | 21.0 | 5.8 | 9 |
| Filter cake (F2) | 20.0 | 6.3 | 6 |
| Filter cake (G1) | 19.0 | 3.7 | 15 |
| Filter cake (G2) | 20.0 | 3.1 | 14 |

TABLE 2

| Example | Catalyst slurry | Catalyst content (% by mass) | Average particle size (μm) | Content of particles in particle size range of 0.15–1 μm (% by volume) | Fluidity of slurry |
|---|---|---|---|---|---|
| 1-A | (A2-S) | 8.53 | 9.3 | Not detected | Good |
| 1-B | (A1-S) | 8.71 | 9.0 | Not detected | Good |
| 1-C | (A2-T) | 7.00 | 8.8 | Not detected | Good |
| 2-A | (B2-S) | 8.89 | 9.8 | Not detected | Good |
| 2-B | (B1-S) | 8.68 | 9.1 | Not detected | Good |
| 3 | (C2-S) | 8.01 | 7.1 | Not detected | Good |
| 4-A | (D2-S) | 5.12 | 2.6 | 28% | Very bad |
| 4-B | (D1-S) | 4.85 | 2.3 | 25% | Very bad |
| 4-C | (D2-T) | 4.05 | 2.1 | 30% | Very bad |
| 6 | (F2-S) | 7.61 | 6.5 | 6% | Slightly bad |
| 7 | (G2-S) | 6.15 | 2.9 | 18% | Slightly bad |

Example 8

Production of Polyol in 5000 ml Reactor 587 g of the polyol R1 and 2.71 g of the catalyst slurry (A2-S) (equivalent to 0.225 g of the catalyst) prepared in Example 1-1 were charged in a 5000 ml pressure-resistant stainless steel reactor equipped with a stirrer. After replacement with nitrogen, the temperature was raised to 120° C., and 59 g of PO was reacted. After the pressure in the system decreased, PO was first continuously supplied at a rate of 20 g/min up to 2600 g and then supplied at a rate of 10 g/min up to 1300 g to prepare a polyol. During the reaction, the inner temperature of the reactor was maintained at 120° C. and the stir rate was kept at 220 rpm. Table 3 shows the properties of the polyol obtained.

Examples 9 to 19

The same operation as in Example 8 was conducted except that the catalyst slurries as shown in Table 3 were used in the masses (g) as shown in the table (each mass corresponds to 0.225 g of the catalyst). Table 3 shows properties of polyols obtained. Examples 9 to 13 are Examples of the present invention and Examples 14 to 19 are Comparative Examples (the catalyst in the form of powder was used in Example 17).

Catalytic Activity in 200 ml Reactor (Life Test)

25 g of the polyol R1 and each catalyst slurry as shown in Table 3, in an amount corresponding to 0.5 mg of the catalyst were charged in a 200 ml pressure-resistant stainless steel reactor equipped with a stirrer. After replacement with nitrogen, the temperature was raised to 120° C. and 8 g of PO was reacted while the stir rate was maintained at 500 rpm. After the pressure in the system decreased, PO was supplied at a rate of 1 g/min while maintaining the inner temperature of the reactor at 120° C., and the stir was continued until polymerization of PO ended. Then the system was depressurized and deaerated and the mass of the polyol produced was weighed. A value obtained by dividing the mass (g) of the resultant polyol by 0.5 mg was defined and calculated as the catalytic activity (PO kg/g catalyst). Table 3 shows the results.

TABLE 3

| Example | Catalyst | Mass (g) | Hydroxyl value (mgKOH/g) | Mw/Mn | Kinematic viscosity at 25° C. (cP) | Total unsaturation degree (meq/g) | Activity |
|---|---|---|---|---|---|---|---|
| 8  | Catalyst slurry (A2-S) | 2.64  | 11.5 | 1.15 | 4680 | 0.0065 | 250 |
| 9  | Catalyst slurry (A1-S) | 2.58  | 11.3 | 1.21 | 5230 | 0.0068 | 180 |
| 10 | Catalyst slurry (A2-T) | 3.21  | 11.3 | 1.13 | 4530 | 0.0064 | 230 |
| 11 | Catalyst slurry (B2-S) | 2.53  | 11.2 | 1.13 | 4550 | 0.0063 | 220 |
| 12 | Catalyst slurry (B1-S) | 2.59  | 11.5 | 1.20 | 5200 | 0.0067 | 170 |
| 13 | Catalyst slurry (C2-S) | 2.81  | 11.6 | 1.18 | 5100 | 0.0065 | 200 |
| 14 | Catalyst slurry (D2-S) | 4.39  | 11.4 | 1.16 | 4920 | 0.0071 | 180 |
| 15 | Catalyst slurry (D1-S) | 4.64  | 11.6 | 1.31 | 7630 | 0.0072 | 55 |
| 16 | Catalyst slurry (D2-T) | 5.56  | 11.4 | 1.18 | 5060 | 0.0071 | 160 |
| 17 | Solid catalyst (E1)    | 0.225 | 11.5 | 1.29 | 7200 | 0.0074 | 220 |
| 18 | Catalyst slurry (F2-S) | 2.960 | 11.4 | 1.25 | 6730 | 0.0071 | 60 |
| 19 | Catalyst slurry (G2-S) | 3.660 | 11.6 | 1.32 | 7560 | 0.0072 | 45 |

It is clear from the above examples that the double metal cyanide complexes obtained in Examples 1 to 3 showed good filterability while the double metal cyanide complexes obtained in Examples 4, 6 and 7 showed very bad filterability.

It is clear from the comparison between Example 14 and Example 15 that in the case where the double metal cyanide complex was prepared by the conventional method, if the filter cake of the double metal cyanide complex was not washed, the catalytic activity was not adequate; whereas, it is clear from the comparison between Examples 8 and 9 and the comparison between Examples 11 and 12 that in the case where the double metal cyanide complex was produced by the process according to the present invention, even if the filter cake of the double metal cyanide complex was not washed, the catalytic activity was high and that the catalytic activity was enhanced by washing.

In Examples 17, 18 and 19 using the double metal cyanide complex catalysts produced by the methods other than the process of the present invention, it was observed that molecular weight distribution of the resulting polyethers was wide, that the catalytic activity was insufficient, and so on.

Production Process of Polyols for Flexible Polyurethane Foams

Example 20

Production of Polyol Z1

400 g of the polyol R2 and 1.77 g (equivalent to 0.151 g of the catalyst) of the catalyst slurry (A2-S) prepared in Example 1-1 were charged in a 5000 ml pressure-resistant stainless steel reactor equipped with a stirrer. After replacement with nitrogen, the temperature was raised to 130° C. and 40 g of PO was reacted. After the pressure in the system decreased, 2100 g of PO was supplied and matured until the pressure of the system became constant. Then an aqueous solution of potassium hydroxide was added, water was distilled off, and 480 g of ethylene oxide (hereinafter referred to as EO) was supplied. The inner temperature of the reactor was kept at 130° C. and the stir rate was kept at 220 rpm during the polymerization reaction. Then the catalyst was removed to obtain a polyol Z1.

Example 21

Production of Polyol Z2

400 g of the polyol R2 and 1.76 g of the catalyst slurry (A2-S) (equivalent to 0.150 g of the catalyst) prepared in Example 1-1 were charged in a 5000 ml pressure-resistant stainless steel reactor equipped with a stirrer. After replacement with nitrogen, the temperature was raised to 130° C. and 40 g of PO was reacted. After the pressure in the system decreased, 1200 g of PO was supplied. Then 960 g of a mixture of PO and EO (in their mass ratio=85/15) was supplied thereto and matured until the pressure of the system became constant. Then an aqueous solution of potassium hydroxide was added, water was distilled off, and 400 g of EO was reacted. The inner temperature of the reactor was kept at 130° C. and the stir rate was kept at 220 rpm during the polymerization reaction. Then the catalyst was removed to obtain a polyol Z2.

Example 22

Production of Polyol Z3

The same operation as in Example 20 was carried out except that 1.70 g (equivalent to 0.151 g of the catalyst) of the catalyst slurry (B2-S) prepared in Example 2-1 was used.

Example 23

Production of Polyol Z4

The same operation as in Example 21 was carried out except that 1.69 g (equivalent to 0.150 g of the catalyst) of the catalyst slurry (B2-S) prepared in Example 2-1 was used.

Table 4 shows the properties of the polyols Z1 to Z4 prepared in Examples 20 to 23.

Examples 24 to 27

Production Process of Flexible Polyurethane Foams

Resilient polyurethane foams were prepared by the following method. Table 5 shows formula ingredients of raw materials. Used as a polyol was 100 parts by mass of a polyol mixture obtained by mixing 40 parts by mass of a polymer-dispersed polyol R3 shown in Table 5 and 60 parts by mass of each of polyols Z1 to Z4.

100 parts by mass of the polyol, 3.0 parts by mass of a cross-linking agent m, 1.0 part by mass of a cross-linking agent n, 1.0 part by mass of a foam stabilizer r, 3.0 parts by mass of a blowing agent s, 0.45 part by mass of an amine catalyst t and 0.1 part by mass of an amine catalyst u, shown in Table 5, were mixed to prepare a polyol system liquid.

Each of the polyol system liquid and polyisocyanate v was adjusted to a liquid temperature of 25° C., and then they were mixed with each other, stirred at 3000 rpm for 5 seconds by a high-speed mixer, poured into a mold, and sealed in. An isocyanate index (an equivalent of the isocyanate compound relative to 100 equivalents of the total active hydrogen compound) was set to 100. The mold used has inside dimensions of 400 mm×400 mm×100 mm (t), and the temperature of the mold was controlled at 60° C. After 6 minutes from the pouring of the raw material, removal from the mold was conducted to obtain a highly resilient polyurethane foam.

Table 6 shows foam properties, vibration characteristics and moldabilities of the highly resilient polyurethane foams produced. The foam properties evaluated herein were a overall density, a core density (unit: kg/m$^3$), a 25% ILD (unit: N/314 cm$^2$), an air flow (unit: ft$^3$/min (SI conversion: 28.3 l/min)), a core impact resilience (unit: %), a tear strength (unit: N/cm), a tensile strength (unit: kPa), an elongation (unit: %), a dry heat compression set (unit: %) and a wet heat compression set (unit: %). The above evaluations were conducted in accordance with JIS K6400.

Measurement methods for the vibration characteristics and the hysteresis loss were based on JASO B407-87. The vibration characteristics evaluated herein were a resonance frequency (unit: Hz), a transmissibility at resonance frequency and a 6 Hz transmissibility obtained in such a manner that a Tekken Plate with the mass of 490 N was placed on a foam sample of 400 mm×400 mm×100 mm (t) and a vibration board was vibrated up and down with the amplitude of ±2.5 mm.

The moldability evaluated herein was workability in an operation of passing a molded sample through rollers having a width of 50 mm (50% based on the initial thickness of the molded sample) 1 minute after the removal (crushing property), and deformation after the crushing was evaluated with eyes (curing property).

TABLE 4

| Polyol | Hydroxyl value (mgKOH/g) | Mw/Mn | Viscosity (25° C., cP) | Total unsaturation degree (meq/g) |
|---|---|---|---|---|
| Z1 | 23.8 | 1.062 | 1550 | 0.0044 |
| Z2 | 23.7 | 1.064 | 1530 | 0.0042 |
| Z3 | 24.1 | 1.066 | 1560 | 0.0047 |
| Z4 | 24.2 | 1.068 | 1540 | 0.0045 |

TABLE 5

| | |
|---|---|
| Polyol R3 | Polymer-dispersed polyol containing in an amount of 35% by mass a polymer obtained by polymerization of a mixture of acrylonitrile/styrene a mass ratio of 60/40 in a polyether polyol (hydroxyl value: 35 mgKOH/g) obtained by ring opening addition polymerization of PO to glycerin and subsequent ring opening addition polymerization of EO. |
| Cross-linking agent m | Polyether polyol (hydroxyl value: 450 mgKOH/g) obtained by ring opening addition polymerization of PO to sorbitol and subsequent ring opening addition polymerization of EO. |
| Cross-linking agent n | diethanolamine (manufactured by Shell Kagaku) |
| Foam stabilizer r | SRX-274 C (manufactured by Dow Corning Toray Silicone Co., Ltd.) |
| Blowing agent s | Water |
| Amine catalyst t | TEDA-L33 (manufactured by TOSOH CORPORATION) |
| Amine catalyst u | TOYOCAT-ET (manufactured by TOSOH CORPORATION) |
| Polyisocyanate v | Mixture of TDI-80/crude MDI in mass ratio of 80/20 (trade name: C-1021 manufactured by Nippon Polyurethane Industry Co., Ltd.) |

TABLE 6

| | 24 | 25 | 26 | 27 |
|---|---|---|---|---|
| Polyol | Z1 | Z2 | Z3 | Z4 |
| Crushing property | Good | Good | Good | Good |
| Curing property | Good | Good | Good | Good |
| Overall density | 49.8 | 49.5 | 49.2 | 49.7 |
| Core density | 44.8 | 45.7 | 44.7 | 45.2 |
| 25% ILD | 221 | 210 | 216 | 207 |
| Air flow | 0.95 | 1.66 | 0.98 | 1.60 |
| Core Impact resilience | 63 | 67 | 62 | 67 |
| Tear strength | 5.4 | 5.5 | 5.4 | 5.6 |
| Tensile strength | 131 | 135 | 136 | 139 |
| Elongation | 104 | 106 | 106 | 107 |
| Dry heat compression set | 2.2 | 2.4 | 2.5 | 2.7 |
| Wet heat compression set | 10.0 | 10.5 | 10.4 | 10.7 |
| Resonance frequency | 3.3 | 3.4 | 3.4 | 3.4 |
| Transmissibility at resonance frequency | 2.1 | 2.9 | 2.3 | 2.8 |
| Transmissibility at 6 Hz | 0.72 | 0.65 | 0.69 | 0.67 |
| Hysteresis loss | 18.8 | 18.5 | 18.8 | 19.0 |

INDUSTRIAL APPLICABILITY

The double metal cyanide complex catalysts according to the present invention are excellent in the filterability and thus are readily produced on an industrial scale, and it is useful as a catalyst applicable to ring opening polymerization of alkylene oxides. In addition, the polyethers prepared by the production process of the polyethers according to the present invention are suitable for raw materials of polyurethane foams or the like.

The entire disclosure of Japanese Patent Application No. 2003-159341 filed on Jun. 4, 2003 including specification, claims and summary is incorporated herein by reference in its entirety.

What is claimed is:

1. A double metal cyanide complex catalyst of a fine particle form comprising t-butyl alcohol or, t-butyl alcohol and another organic compound as an organic ligand,
   wherein the catalyst of the fine particle form has a volume-average particle size in a range of from 3 to 20

μm, based on measurement by a light scattering method for measuring fine particles having particle sizes of at least 0.15 μm, wherein a particle content of the catalyst in a particle size range of at least 0.15 μm and at most 1 μm is less than 5% by volume, and wherein a particle content of the catalyst over a particle size of 1 μm is in a range of more than 95% and at most 100% by volume.

2. The double metal cyanide complex catalyst according to claim 1, substantially comprising no particles of the catalyst in the particle size range of at least 0.15 μm and at most 1 μm.

3. The double metal cyanide complex compound according to claim 1, wherein the organic compound used as the organic ligand together with t-butyl alcohol is at least one or two members selected from n-butyl alcohol, isobutyl alcohol, t-pentyl alcohol, isopentyl alcohol, N,N-dimethylacetamide, ethylene glycol mono-t-butyl ether, ethylene glycol dimethyl ether, diethylene glycol dimethyl ether, triethylene glycol dimethyl ether, isopropyl alcohol and dioxane.

4. A catalyst-containing composition, wherein the double metal cyanide complex catalyst as defined in claim 1 is dispersed in at least one dispersion medium selected from polyether monools and polyether polyols.

5. The catalyst-containing composition according to claim 4, wherein a content of the catalyst in the catalyst-containing composition is in a range of from 5 to 30% by mass.

6. A process for producing the double metal cyanide complex catalyst as defined in claim 1, comprising (1) a step (a) of merging a continuous flow of an aqueous solution of a metal halide compound and a continuous flow of an aqueous solution of an alkali metal cyanometalate in such a proportion that an atomic number ratio of (metal atoms in the metal halide compound)/ (metal atoms other than an alkali metal in the alkali metal cyanometalate) is in a range of from 5 to 16, and transferring the merged liquid to a first reactor mentioned below, (2) a step (b) of retaining the merged liquid in the first reactor under stirring at a temperature of from 0 to 90° C. for an average residence time of at least 1 minute to react the metal halide compound with the alkali metal cyanometalate, and continuously transferring a reaction product liquid to a second reactor mentioned below, (3) a step (c) of continuously introducing a flow of an organic ligand or an aqueous solution of an organic ligand into the second reactor, retaining a mixture of the organic ligand or the aqueous solution of the organic ligand with the reaction product liquid in the second reactor under stirring at a temperature of from 40 to 100° C. for an average residence time of at least 3 minutes to obtain a dispersion liquid comprising a double metal cyanide complex catalyst, and continuously transferring the dispersion liquid to the following step (d), and (4) the step (d) of filtering the dispersion liquid to obtain a filter cake comprising the double metal cyanide complex catalyst.

7. The process according to claim 6, further comprising a step (e) of mixing the filter cake obtained in the step (d) with an aqueous solution of an organic ligand to obtain a mixture, stirring the mixture at a temperature of from 0 to 100° C. for a period of time, and filtering the mixture to obtain a second filter cake, and optionally further comprising a step (e') of repeating the same step as the step (e) at least once for the second filter cake with an organic ligand or an aqueous solution of an organic ligand to obtain a third or subsequent filter cake.

8. The process according to claim 6, wherein a content of the double metal cyanide complex catalyst in the filter cake obtained in the step (d), (e) or (e') is in a range of from 20 to 60% by mass.

9. A process for producing the catalyst-containing composition as defined in claim 4, comprising mixing the filter cake obtained in the step (d), (e) or (e') in the process as defined in claim 6 with at least one dispersion medium selected from polyether monools and polyether polyols, and optionally removing volatile components.

10. A process for producing the catalyst-containing composition as defined in claim 4, comprising mixing the filter cake obtained in the step (d), (e) or (e') in the process as defined in claim 6 with an organic ligand or an aqueous solution of an organic ligand to obtain a mixture, stirring the mixture for a period of time, then mixing the mixture with at least one dispersion medium selected from polyether monools and polyether polyols, and thereafter removing volatile components.

11. A process for producing a polyether, which comprises:

subjecting an alkylene oxide to ring opening polymerization with an initiator in the presence of the double metal cyanide complex catalyst as defined in claim 1.

12. A process for producing a polyether, which comprises:

subjecting an alkylene oxide to ring opening polymerization with an initiator in the presence of the catalyst-containing composition as defined in claim 4.

13. The double metal cyanide complex catalyst according to claim 1, wherein the particle content of the catalyst in a particle size range of at least 0.15 μm and at most 1 μm is less than 3% by volume.

14. The double metal cyanide complex catalyst according to claim 1, wherein the particle content of the catalyst in a particle size range of at least 0.15 μm and at most 1 μm is less than 1% by volume.

* * * * *